UNITED STATES PATENT OFFICE.

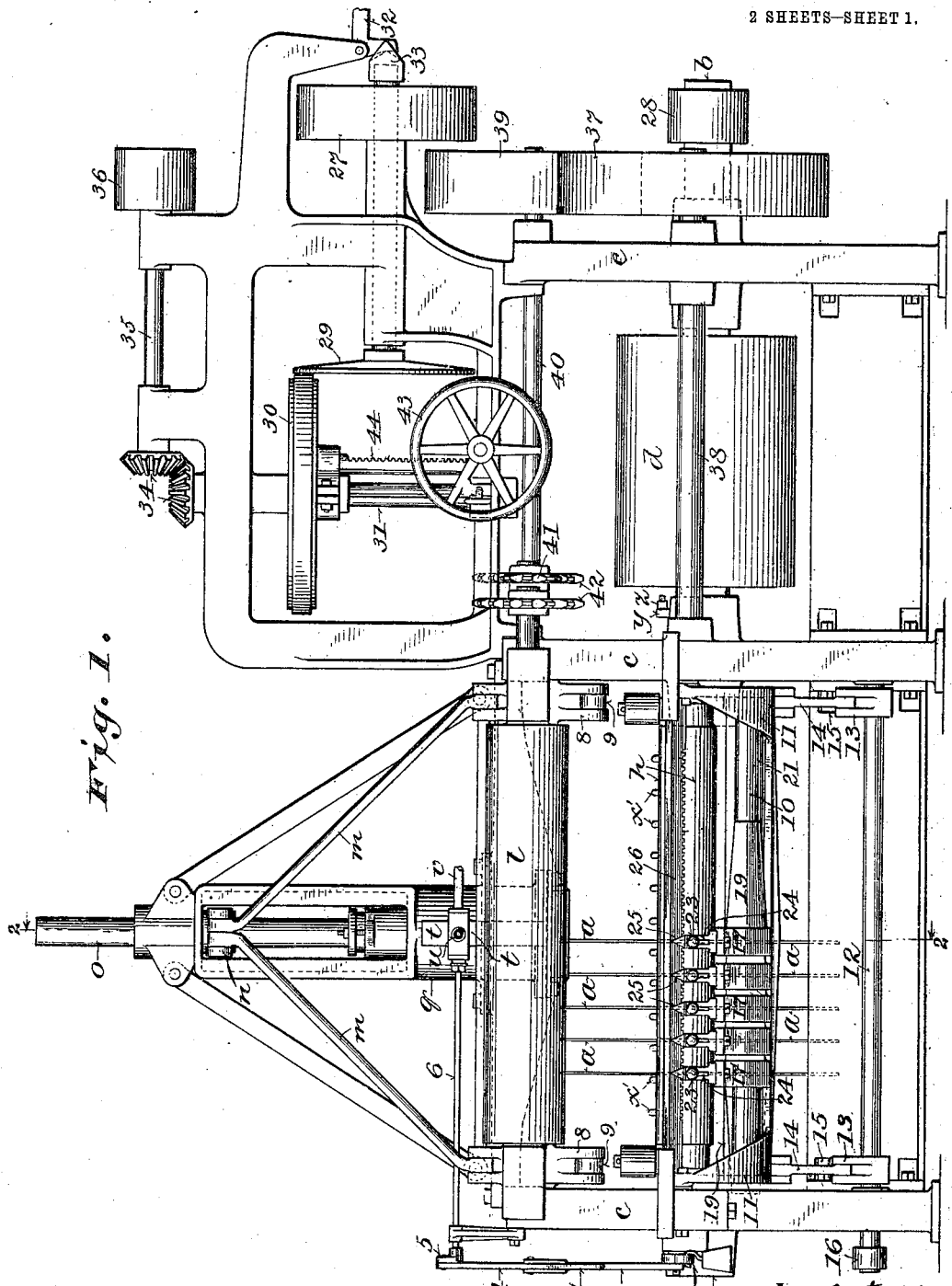

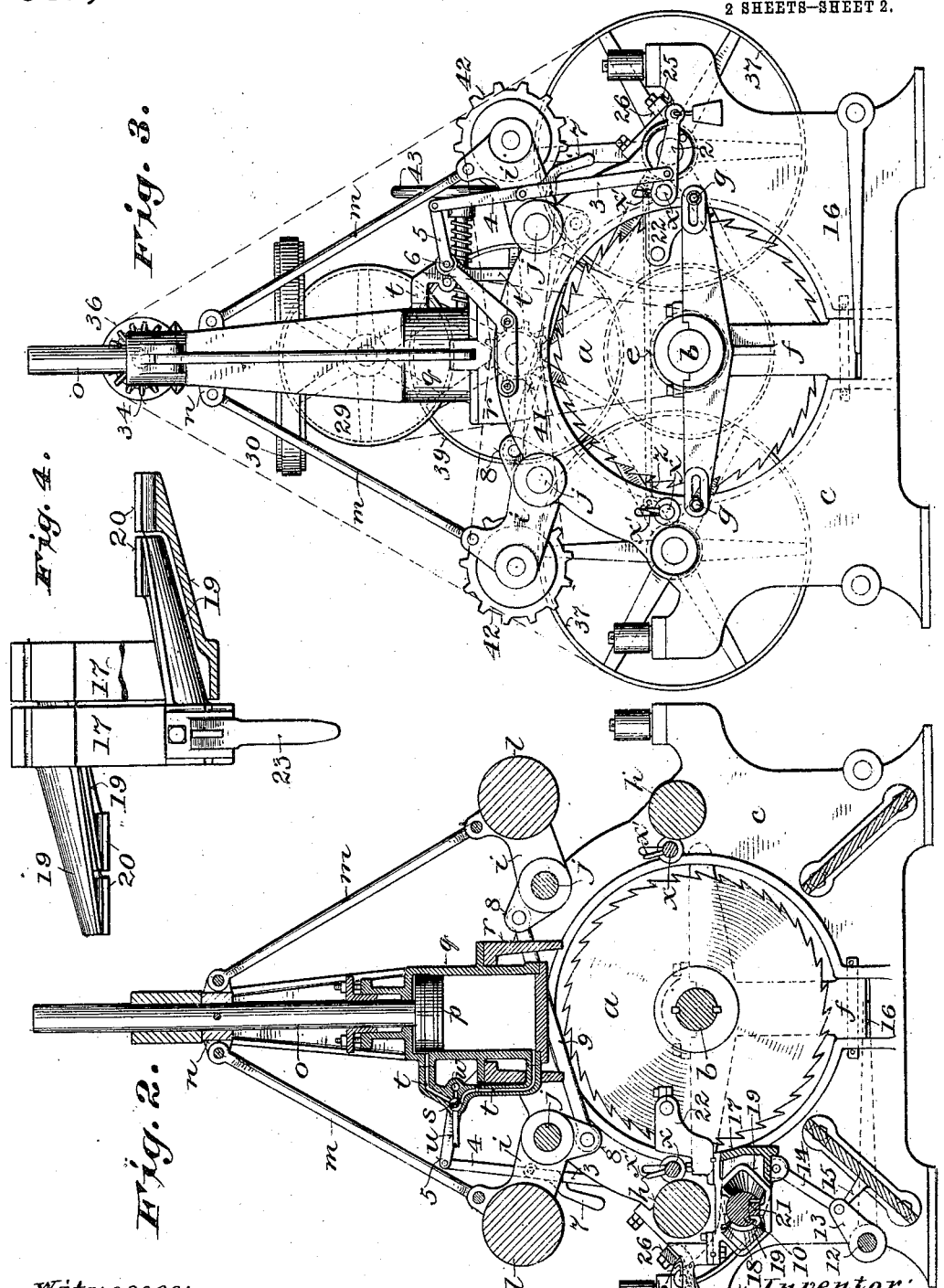

GEORGE M. PELTON, OF MILWAUKEE, WISCONSIN, ASSIGNOR TO THE FILER & STOWELL COMPANY, OF MILWAUKEE, WISCONSIN, A CORPORATION OF WISCONSIN.

EDGER.

981,467.

Specification of Letters Patent. Patented Jan. 10, 1911.

Application filed March 13, 1909. Serial No. 483,114.

*To all whom it may concern:*

Be it known that I, GEORGE M. PELTON, a citizen of the United States, residing at Milwaukee, in the county of Milwaukee and State of Wisconsin, have invented certain new and useful Improvements in Edgers, of which the following is a specification, reference being had to the accompanying drawing, forming a part thereof.
This invention relates more particularly to a gang edger which has a number of circular saws separately adjustable toward and from one another endwise of the arbor on which they are mounted. Its main objects are to automatically shift the upper feed rollers into and out of operative position as the lumber to be edged and cut to the desired width or thickness is entered into and discharged from the machine; to provide improved means for rotating and adjusting the speed of the feed rollers, and generally to improve the construction and operation of machines of this class.

It consists in the peculiar construction, arrangement and combination of parts as hereinafter particularly described and pointed out in the appended claims.

In the accompanying drawing like characters designate the same parts in the several figures.

Figure 1 is a front elevation of a gang edger embodying the invention; Fig. 2 is a vertical cross section of the same on the line 2 2, Fig. 1; Fig. 3 is an end elevation as viewed from the left with relation to Fig. 1; and Fig. 4 is a detail view on an enlarged scale partly in section, of two saw shifters.

As shown in Figs. 1, 2 and 3 of the drawing, a number of circular saws $a$ are mounted on and movable lengthwise of a horizontal arbor $b$, which is supported in bearings in the frame $c$. The saws are splined or feathered as shown in Fig. 2, on the arbor, so as to turn therewith, and the arbor is provided as shown in Fig. 1, with a driving pulley $d$. The frame is formed at one end as shown in Figs. 2 and 3, with a circular opening of sufficient size to admit of removing and replacing the saws $a$ on the arbor $b$, and the bearing $e$ of the arbor at that end of the machine is carried by a T-shaped support $f$ which is hinged in the frame at the lower side of said opening, the cross piece spanning the opening being detachably secured to the frame by bolts $g$.

Feed rollers $h$ are journaled in the frame parallel with the arbor $b$ before and behind the saws, and in vertically swinging arms of angular levers $i$ which are pivotally mounted on cross shafts $j$ connecting the side pieces of the frame, are journaled the upper feed rollers $l$ parallel with the rollers $h$. The vertically swinging arms of said levers $i$ are connected by links $m$ with a cross head $n$ on the rod $o$ of the piston $p$ of a steam or other fluid pressure motor, the cylinder $q$ of which is mounted in a vertical position on a cross strut $r$ of the frame.

A rocking valve $s$ (shown in Fig. 2) controls the admission and release of steam or other fluid pressure medium through passages $t$ into and from opposite ends of the cylinder $q$. A pipe $u$ (shown in Figs. 1 and 2) supplies the steam or other fluid pressure medium to the valve chamber, and an exhaust pipe $v$ (shown in Fig. 1) communicates through a passage $w$ (shown in Fig. 2) with the valve chamber. Between and parallel with the saw arbor $b$ and the lower feed rollers $h$ before and behind the saws, rocker shafts $x$ are journaled in the frame and are provided at their inner ends with arms $y$ which are connected by a rod $z$, as shown in Figs. 1 and 3, so as to compel them to rock together. At its outer end, one of the shafts $x$ is provided with a weighted arm 2 which is connected by a jointed rod or link consisting of two pivotally connected members 3 and 4 with an arm 5 on the extended stem 6 of the valve $s$. One member 4 of the jointed connecting link is formed with an offset handle 7, whereby the said connection may be broken or bent so as to reverse the valve, as hereinafter explained.

The shafts $x$ are provided at short intervals with radial fingers or projections $x'$ which extend normally upward across the path of lumber through the machine between the feed rollers $h$ and $l$.

To cause the upper feed rollers $l$ to move up and down together and to equally distribute the pressure or force exerted through them on opposite sides of the piston rod so as to avoid bending strains thereon and consequent binding thereof in its guides or bearings, the levers $i$ are formed or provided at their inner ends with arms 8 which are connected by links or rods 9, the arms on one side of the machine being disposed in an opposite direction to those on the other side.

Below the lower front feed roller $h$ and parallel therewith, a longitudinally grooved cross shaft or guide 10 is supported at the ends parallel with said roller in a swinging frame 11, which is hinged in front of said roller to the frame $c$ so that said shaft or guide may be moved laterally toward and from the saws. A rocker shaft 12 mounted in the frame $c$ below and parallel with the shaft or guide 10 is provided with arms 13, which are connected by links 14 with the swinging frame 11. Stops 15 on a part of the frame $c$ are arranged as shown in Fig. 2 by engagement with the arms 13 to support the shaft or guide 10 in working position. At its outer end the shaft 12 is provided with a lever arm 16 for rocking it and swinging the frame 11 from and toward the saws. Saw shifters 17, mounted on and adjustable lengthwise of the shaft or guide 10 and having bearings 18 on the upper side thereof as shown in Fig. 2, are each formed or provided, as shown in Figs. 1 and 4, with stay arms 19 projecting therefrom in opposite directions and on opposite sides of said shaft or guide. These stay arms terminate in tongues 20 which engage with parallel longitudinal grooves 21 formed in the under side of the shaft or guide 10, as shown in Figs. 1 and 2. They are inclined inwardly toward their outer ends and toward the shaft or guide 10 and are arched or recessed as shown in Figs. 2 and 4, so as to fit one over another or to nest when the shifters are brought together as shown in Fig. 4. By this construction of the shifters they are provided with widely separated bearings on the shaft or guide 10 and are thus firmly supported thereon, with very little play or lost motion, and at the same time may be adjusted so as to set the saws close to one another for cutting narrow or thin stuff. Each shifter is provided with a saw guide 22 which embraces and determines the position of one of the saws $a$. It is also provided with an operating handle 23, having a pivoted latch 24 and an index or pointer 25. A graduated toothed locking bar 26 is arranged parallel with the shaft or guide 10 in position to work with the latches 24 and the indexes or pointers 25 for determining the position of the saws and locking them in place.

The feed rollers are driven at a variable speed from the saw arbor by the following described mechanism, shown in Figs. 1 and 3: A countershaft above and parallel with the saw arbor is provided with a pulley 27 which is connected as indicated in Fig. 3 by a belt with a pulley 28 on the saw arbor. It is also provided with a friction disk 29 working with a friction wheel 30 feathered and adjustable up and down on a vertical shaft 31. The face of the disk 29 is held in yielding engagement with the periphery of the wheel 30 by a weighted lever 32 partially shown in Fig. 1, and engaging a thrust bearing 33 on the outer end of said countershaft. The shaft 31 is connected at its upper end by bevel gears 34 with a shaft 35, which is parallel with the saw arbor and is provided with a pulley 36. The pulley 36 is connected by a belt, as indicated by dotted lines in Fig. 3, with pulleys 37 mounted on the extended shafts 38 of the lower feed rollers $h$, and with an intermediate pulley 39 on a shaft 40 directly above and parallel with the saw arbor. The shaft 40 is provided with sprocket wheels 41, which are connected as indicated by dotted lines in Fig. 3, by link belts with sprocket wheels 42 on the adjacent ends of the shafts of the upper feed rollers $l$. The friction wheel 30 is adjusted up and down to vary the speed of the feed rollers by means of a hand wheel 43, the shaft of which has a pinion meshing with a rack 44 which is fastened to a collar in which the hub of the friction wheel 30 turns.

The machine hereinbefore described operates as follows: The valve $s$ and the rocker shafts $x$ with their trip fingers $x'$ being held normally by the weighted lever 2 in the positions in which they are shown in the several figures, particularly Fig. 2, steam is admitted from the supply pipe $u$ through the lower passage $t$ into the lower end of the cylinder $q$ while the upper end of the cylinder is open to exhaust through the upper passage $t$ and the connecting passage $w$ and pipe $v$. The upper feed rollers $l$ are thus held by the piston $p$ in their uppermost positions, and the trip fingers $x'$ are held standing up across the path of lumber as it is fed into and out of the machine. The saws being adjusted as desired on the arbor $b$ and driven by a belt on the pulley $d$, the lumber to be edged and cut to the desired width or widths is fed into the machine upon the lower front roller $h$, and as the ends of the pieces are thrust against and turn the trip fingers $x'$ backward, the valve $s$ is reversed through the connections hereinbefore described, so as to admit steam into the upper end and exhaust it from the lower end of the cylinder $q$. The piston $p$ is thus forced downward, carrying the upper feed rollers $l$ downward toward the lower rollers $h$. The piece or pieces of lumber being thus firmly grasped between the front feed rollers $h$ and $l$, which are turned by the connections with the saw arbor as hereinbefore described, is automatically fed to the saws, and passing between the rear rollers is fed forward by them after it clears the front rollers and until it clears the trip fingers $x'$ on the rear rocker shaft $x$, whereupon the weighted arm 2 will turn the valve $s$ back to its original position as shown in Fig. 2, and the upper rollers $l$ will be lifted by the piston $p$ to their upper positions.

In case it is desired to withdraw a piece of lumber before a cut is finished, the operator grasping the handle 7 and breaking or bending the jointed link connection 3—4 between the arm 2 and the arm 5 on the valve stem, turns the valve $s$ back to its initial position, thereby causing the piston $b$ to move upward and lift the upper rollers $l$, and pushing the handle 7 backward, the link connection is straightened and restored to its normal working condition.

The saws are easily and quickly adjusted by grasping the handles 23 with the latches 24 of the shifters, thereby unlocking them from the toothed bar 26. They may then be moved with the saws $a$ lengthwise of the arbor $b$ and shaft or guide 10 to the desired positions indicated by the pointers 25 on the graduated locking bar. When thus brought to the desired positions and the latches 24 are released, they will be locked in such positions by the engagement of the latches with the bar 26.

The saws are easily and quickly removed from the arbor $b$ and replaced thereon by turning the lever arm 16 upward and forward, thereby swinging the frame 11 downward and forward and carrying the guides 22 out of engagement with the saws, and by removing the cap of the bearing $e$ and the bolts or fastenings $g$, and turning the support $f$ outward and downward. The saws may then be withdrawn from the arbor through the opening in the end of the frame $c$, and replaced in like manner.

Various modifications in the details of construction and arrangement of parts may be made without materially affecting the principle and operation of the machine, and without departing from the principle of the invention.

I claim:

1. In an edger the combination with a saw, of feed rollers one of which is movable toward and from the other, a motor connected with the movable feed roller, and a trip arranged in the path of lumber passing through the machine and controlling the operation of the motor.

2. In an edger the combination with a saw, of opposing feed rollers one of which is movable toward and from the other, a motor connected with the movable feed roller, and a movable trip adapted when engaged by a piece of lumber passing through the machine to cause the motor to shift the movable feed roller toward the other roller and hold it in engagement with said piece of lumber.

3. In an edger the combination with a saw, of opposing feed rollers arranged before and behind the saw, one of each pair being movable toward and from the other, a motor connected with the movable rollers, trips located between the saw and feed rollers and adapted when engaged by a piece of lumber passing through the machine to cause the motor to press and hold the movable rollers toward the other rollers against said piece of lumber.

4. In an edger the combination with a saw, of a pair of feed rollers one of which is movable toward and from the other, a motor comprising a cylinder having a piston connected with said movable roller, a valve controlling the admission and release of a fluid pressure medium into and from opposite ends of the cylinder, and a movable valve-operating trip standing normally in the path of lumber through the machine.

5. In an edger the combination with a saw, of feed rollers arranged before and behind the saw in pairs, one roller of each pair being movable toward and from the other and the movable rollers being connected so as to be operated simultaneously, a cylinder having a piston connected with said movable rollers, a valve controlling the admission and release of a fluid pressure medium into and from opposite ends of said cylinder, and a movable valve-operating trip standing normally in the path of lumber through the machine.

6. In an edger the combination with a saw, of feed rollers arranged in pairs before and behind the saw parallel with its axis, vertically swinging arms carrying one roller of each pair, a vertical cylinder having a piston connected with said arms by links so as to swing them up or down simultaneously, a valve controlling the admission and release of a fluid pressure medium into and from opposite ends of said cylinder, and a movable trip connected with said valve and standing normally in the path of lumber through the machine.

7. In an edger, the combination with a frame and a saw mounted therein on a horizontal arbor, of feed rollers arranged in pairs before and behind the saw arbor and parallel therewith, vertically swinging angular levers carrying one roller of each pair, a link connecting oppositely directed arms on said levers, a vertical cylinder having a piston the rod of which is connected by links with said levers, a valve controlling the admission and release of a fluid pressure medium into and from said cylinder, and a movable trip standing normally in the path of lumber through the machine and connected with said valve.

8. In an edger the combination with a saw, of feed rollers one of which is movable toward and from the other, a cylinder having a piston connected with the movable roller, a valve controlling the admission and release of a fluid pressure medium into and from opposite ends of said cylinder, a movable trip standing normally in the path of lumber through the machine and connected with said valve, and means for reversing said valve while the trip is engaged by a piece of lumber.

9. In an edger the combination with a number of saws mounted and adjustable endwise on their arbor, of opposing feed rollers arranged parallel with the saw arbor, one of said rollers being movable toward and from the other, a motor connected with the movable roller, and a rocker shaft between and parallel with the saw arbor and feed rollers having trip fingers or projections standing normally in the path of lumber through the machine and adapted when engaged by a piece of lumber to cause the motor to press and hold the movable roller toward the opposing roller against said piece of lumber.

10. In an edger the combination with a saw arbor and a number of saws mounted upon and adjustable endwise thereof, of feed rollers arranged in pairs before and behind the saws and parallel with its arbor, one roller of each pair being movable toward and from the other, a motor connected with the movable feed rollers, and trips controlling the operation of the motor and consisting of rocker shafts located between and parallel with the saw arbor and the feed rollers and having fingers or projections standing normally in the path of lumber through the machine, said shafts having arms connected by a rod or link whereby both trips are operated together.

11. In an edger the combination with the saws, of feed rollers one of which is movable toward and from the other parallel with the saw arbor, a reciprocating piston motor connected with the movable roller, a valve controlling admission and release of a fluid pressure medium into and from opposite ends of the motor cylinder, a rocker shaft between and parallel with the saw arbor and feed rollers provided with an arm and with trip fingers which stand normally in the path of lumber through the machine, a jointed link connection between said arm and valve adapted to be broken so as to reverse the valve when any of the trip fingers are engaged by a piece of lumber.

12. In an edger the combination with a saw of a feed roller movable toward and from the path of lumber through the machine, a power connection for moving said roller into and out of operative position, and a trip arranged in the path of the lumber and controlling the operation of said roller by said power connection.

13. In an edger the combination with a saw, of feed rollers arranged before and behind the saw and connected so as to be movable simultaneously toward and from the path of lumber through the machine, a power connection for moving said rollers into and out of operative position, and trips arranged in the path of lumber as it passes to and from the saw and controlling the operation of said rollers by said power connection.

14. In an edger the combination with a saw of feed rollers arranged before and behind the saw and movable toward and from the path of lumber through the machine, a power connection for moving said rollers into and out of operative position, and trips arranged in the path of lumber as it passes to and from the saw and controlling the operation of said rollers by said power connection, said trips being connected so as to operate together.

15. In an edger the combination with a saw, of a feed roller movable toward and from the path of lumber through the machine, a power connection for moving said roller into and out of operative position, a trip arranged in the path of the lumber and automatically controlling the operation of said roller by said power connection, and means for manually causing said power connection to shift said roller out of operative position while the trip is engaged by a piece of lumber.

16. In an edger the combination with a saw and its arbor, which is provided with a pulley, of a feed roller movable toward and from the path of lumber through the machine and provided with a sprocket wheel, a power connection for moving said roller into and out of operative position, a trip arranged in the path of the lumber and controlling the operation of said roller by said power connection, counter shafts parallel with the saw arbor, one being provided with a friction disk and with a pulley which is connected by a belt with the pulley on the saw arbor, another being provided with a pulley and with a sprocket wheel which is connected by a link belt with the sprocket wheel of said roller, and another being provided with a pulley which is connected by a belt with the pulley on the sprocket wheel shaft, and a transverse shaft connected by bevel gears with the countershaft which is belted to the sprocket wheel shaft and provided with an adjustable friction wheel engaging said friction disk.

17. In an edger the combination with a saw and its arbor which is provided with a pulley, of feed rollers arranged parallel with the saw arbor before and behind the same, the upper rollers being movable toward and from the lower rollers and provided with sprocket wheels, a power connection for moving the upper rollers toward and from the lower rollers, a trip arranged in the path of the lumber and controlling the operation of the upper rollers by said power connection, countershafts parallel with the saw arbor, one being provided with a friction disk and with a pulley which is connected by a belt with the pulley on the saw arbor, another being provided with a pulley and with sprocket wheels which are connected by link belts with the sprocket wheels of the upper rollers, and another being provided with a pulley which is connected by a belt with pulleys on the shafts of the lower feed rollers and with a pulley on the sprocket wheel shaft, and a transverse shaft connected by bevel gears with the countershaft which is belted to the sprocket wheel shaft and provided with an adjustable friction wheel engaging said friction disk.

In witness whereof I hereto affix my signature in presence of two witnesses.

GEORGE M. PELTON.

Witnesses:
CHAS. L. GOSS,
FRANK E. DENNETT.